Inventor:
Johann Kessler

Inventor:
Johann Kessler,
by Singer, Stern & Carlberg
Attorneys.

Oct. 31, 1967  J. KESSLER  3,350,704
FUEL STORAGE TANK INSTALLATIONS LEAK INDICATOR
Filed April 13, 1965  3 Sheets-Sheet 3
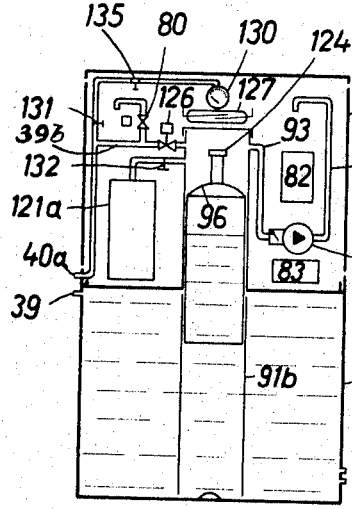
Fig. 10
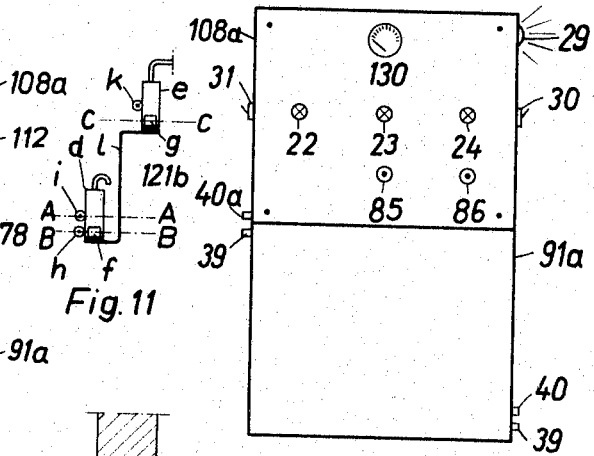
Fig. 11
Fig. 12
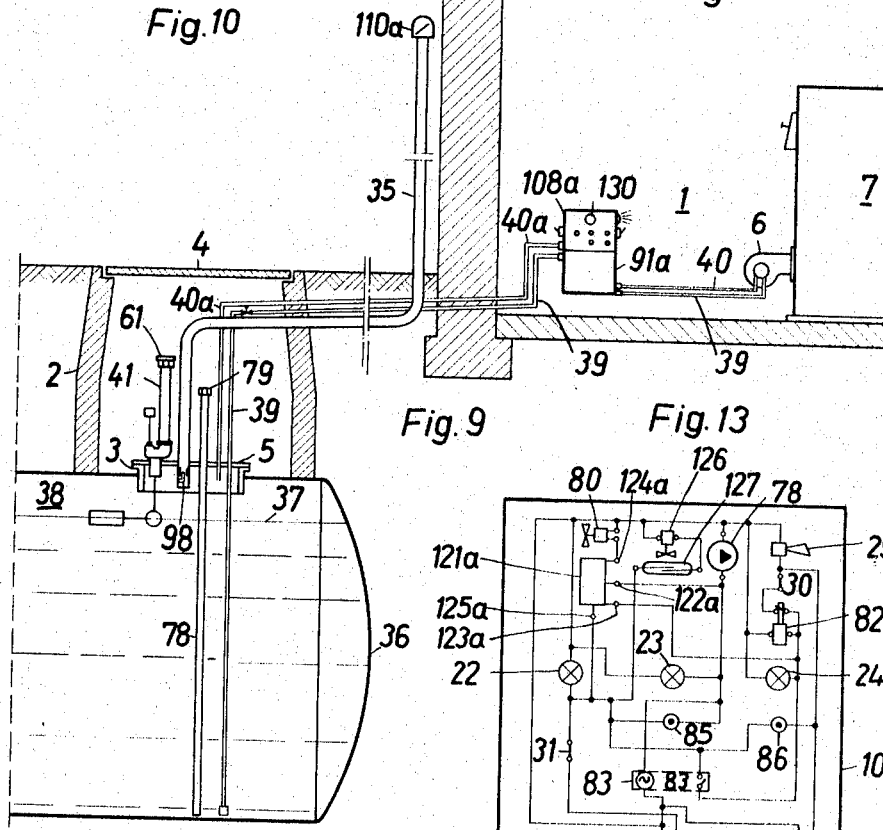
Fig. 9
Fig. 13
Inventor:
Johann Kessler
by Singer, Stern & Carlberg
Attorneys.

United States Patent Office 3,350,704
Patented Oct. 31, 1967

3,350,704
FUEL STORAGE TANK INSTALLATIONS LEAK INDICATOR
Johann Kessler, Lindhooper Str. 20, Verden, Aller, Germany
Filed Apr. 13, 1965, Ser. No. 447,819
Claims priority, application Germany, Apr. 15, 1964, K 52,673
13 Claims. (Cl. 340—242)

The present invention relates to fuel storage tank installations and particularly to a leak-indicator- and fluid-loss preventing device for the same provided with a vacuum pump device and a vacuum control device for the limitation and maintenance of a desired vacuum, as well as with pressure-indicating devices.

The safeguarding of fluid-containers particularly those buried in the ground against loss of fluid upon the springing of leaks, constitutes today an important problem for keeping the soil clean for preventing contamination of underground water. Therefore a number of different suggestions have already been made for indicating immediately a leakage of fluid from a tank buried in the ground and to prevent, if possible, a loss of such fluid.

In addition to the employment of very high-priced construction of double-walled tanks and the proposal of providing tanks already embedded in the ground with a protective shell of concrete, which requires excavation work, it has also been suggested to connect the gas space in the tank with a vacuum pump device and to maintain therein through a suitable control device a vacuum, which is to prevent a loss of fluid upon the occurrence of a leak. Through the air entering into the tank upon a leak, the vacuum in the tank is then decreased—which is indicated by a pressure-indicating-device.

It is an object of the invention to provide a vacuum control device as well as pressure-indicating- and fluid-loss-preventing device which requires very little space, and by way of example may be installed in simple manner in the dome-compartment of a tank. The invention additionally has the advantage of making possible a simple measuring of the quantity of fluid present in the tank. Since the installation may be regulated to a very low vacuum-excess corresponding to the particular fluid or oil level in the tank, the device of the invention is adapted to be used with advantage for multiple tanks installed in basements. In this manner the heretofore high costs for sealing of the bottom and the walls of the oil storage space may be saved.

In accordance with another object of the invention the vacuum control device includes in addition to devices for limiting the vacuum a float-control whose fluid chamber is in communication with the fluid in the tank and whose air space is in communication with the vacuum pump installation and by a valve actuated by the float may be brought in communication with the gas or air space in the tank.

Still another object of the invention is the employment of a valve actuated by the float comprising a plate which is actuated by a float—it may however also be an electrically controlled solenoid-valve, whose circuit is closed or opened respectively by a switch advantageously magnetically actuated by the float.

The invention also has as one of its objects to connect the air space in the float container with three diaphragm switches, which upon an undesired rising of the vacuum beyond a predetermined value, for example, upon a loss of fluid from the tank, closes the circuit of a vent valve, which brings the gas chamber in the tank in communication with the atmosphere, while the second diaphragm switch, upon lowering of the vacuum closes the circuit of a vacuum pump device, while the third diaphragm switch upon a further lowering of the vacuum closes an alarm circuit of a preferably acoustic and/or optical alarm indication device.

In place of the three diaphragm switches, there may also be used to advantage a small mercury-U-pipe-manometer, in whose leg corresponding switch contacts are inserted at different levels or which contain a float, which opens or closes upon the predetermined pressures the respective electric circuits.

The drawings illustrate by way of example several embodiments of the invention.

In the drawings:

FIG. 1 shows in a partially sectional view a leak-indicating- and fluid-loss-preventing device arranged in the dome-compartment of an underground fuel storage tank installation;

FIG. 2 discloses diagrammatically the details of the float regulator employed in the device shown in FIG. 1;

FIG. 9 illustrates another embodiment of the invention with a float regulator-housing arranged outside of the fuel storage tank;

FIG. 10 illustrates details of the control device of the embodiment shown in FIG. 9;

FIG. 11 illustrates another form of a three-stage control switch which may be used;

FIG. 12 is a front view of the control housing;

FIG. 13 illustrates diagrammatically the switch arrangement employed in the embodiment of FIG. 9.

Figure 1:
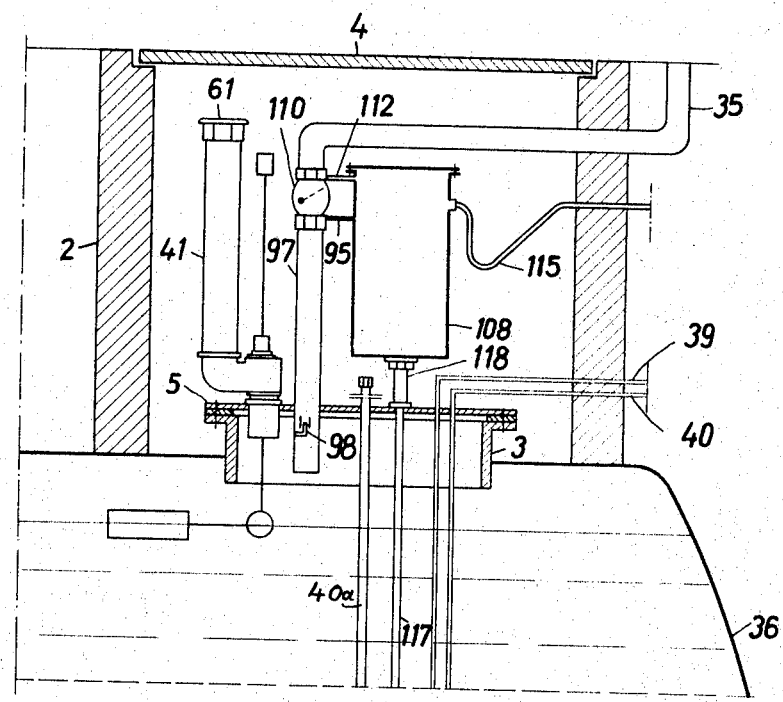
Figures 2, 3, 4, 5:
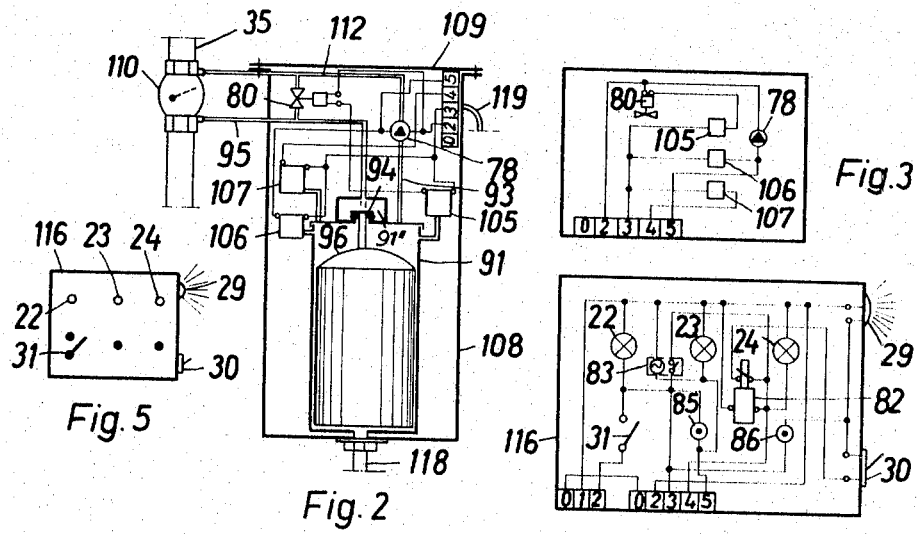
FIGS. 3 and 4 illustrate diagrammatically the details of the switch arrangement in the device of FIG. 1.
FIG. 5 is a view of the switchboard.
Figure 14:
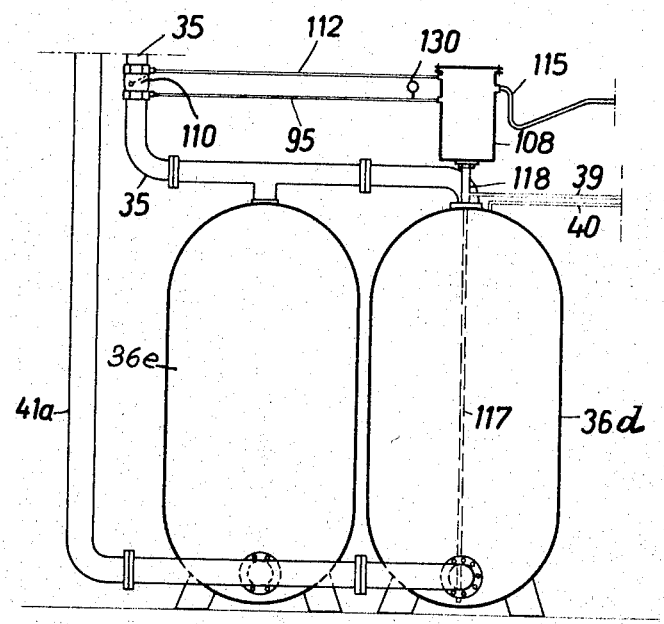
FIG. 14 illustrates a leak-indicating- and fluid-loss-preventing device, similar to FIG. 1, but employed in connection with a multiple tank installation in a basement.

Referring to FIG. 1, a dome-compartment 2 on top of the tank 36 is closed at its upper end by a cover 4, which permits access to the tank cover 5 of the tank 36. The tank is filled with a fluid by a filling pipe 41 which extends through the tank cover 5 and is connected with a not-illustrated overflow-safety device and is closed airtight at its upper end by a screw cap 61. The air displaced during the filling of the tank with fluid may escape through a stand-pipe 97 and a flap-valve 110 into a vent pipe 35. An acoustic overflow signal device is connected to the stand-pipe and consists of a whistle 98 inserted laterally in the lower portion of the stand-pipe 97. Through this whistle the air displaced by the fluid must flow as soon as the fluid has reached the lower end of the stand-pipe 97. The stand-pipe 97 is connected below the flap-valve 110 by means of a pipe line 95 with the valve chamber 91' of a float container 91 (FIG. 2). Closely above the flap-valve 110 is attached a pipe line 112 leading likewise into the float container 91 in the control housing 108. The bottom wall of the control housing 108 by means of a nipple 118 is attached to the tank cover 5 and is connected by a pipe line 117 with the fluid in the tank 36. Through the tank cover 5 extend also a pipe line 39 for supplying fluid, namely fuel oil, to an oil-burner, a return pipe 40 and a gauge pipe 40a. The latter is not described in greater detail but serves for receiving a gauging rod. The pipe line 39 may also be connected directly with the pipe line 117 at the nipple 118, as illustrated in FIG. 14 showing another embodiment of the invention.

The further construction of the float control device is apparent from FIG. 2. The nipple 118 and the pipe line 117 which leads to the bottom of the tank 36 connects the fluid space of the float container 91 with the fluid in the tank 36. The float container 91 contains the float 96, whose upper end carries a valve-plate 94. This valve plate 94 in the lower position of the float 96 shown in the drawing seals the air space above the fluid from the valve chamber, which by the pipe line 95 and the stand-pipe 97 is in connection with the air space above the fluid in the tank 36. The air space of the float container 91 is furthermore connected by the pipe line 93 with a vacuum pump 78, whose exhaust is connected by the pipe line 112 with the vent pipe 35. This vacuum pump, as shown in FIGS. 3 and 4, is connected together with the preferably yellow pre-alarm light and the clockwork of a time-switch 83 of a diaphragm switch 106 serving as pre-alarm-switch upon a drop in the vacuum below a predetermined value. A diaphragm switch 107 likewise connected to the air space of the float container 91, and serving as alarm switch, closes upon a further drop of the vacuum the alarm circuit, which includes a preferably red signal lamp 24 and a buzzer 29 connectable by a momentarily operable switch 82, said buzzer being capable of being disconnected by a preferably lead-sealed buzzer switch 30. A third diaphragm switch 105 connected to the air space in the float container 91 serves for the opening and closing of a solenoid operated vent valve 80 connected between the pipe line 95 leading to the vacuum side to the float container 91 and the pipe line 112 on the atmospheric side because the pipe 112 is connected with the vent pipe 35, the circuit of this solenoid operated vent valve 80 upon too high a rise of the vacuum being closed by the diaphragm switch 105, so that the solenoid becomes energized and opens the valve 80. Air may then flow from the atmosphere into the air space of the tank until the predetermined maximum vacuum is again established.

The embodiment of the invention shown by way of example in the FIGS. 1 to 5 operates as follows: After the tank 36 has been filled with fluid by the filling pipe 41 and the displaced air has escaped through the stand-pipe 97 the lifted flap valve 110 and vent pipe 35, the filling pipe 41 is closed airtight by the screw cap 61. After the flap-valve 110 has dropped, atmospheric pressure prevails in the tank space above the fluid and also in the air space of the float container 91 because the pressure equalization produced during the filling of the tanks has caused the float 96 to rise. During this atmospheric pressure, the pre-alarm switch 106 and the alarm switch 107 adjusted to predetermined low pressures are closed—which has the result that the circuit including the vacuum pump 78, the yellow pre-alarm lamp 23 and for the clockwork of the time switch 83 in the pre-alarm-circuit and in the alarm circuit of the circuit for the preferably red alarm lamp 24 and for the momentary switch 82 is closed. The momentary switch is so constructed, that at the first impulse now taking place it still holds the circuit for the buzzer 29 open, but closes it upon a second impulse, that is, when after the filling and evacuation a further rise in pressure should take place in the air space above the fluid in the tank 36, which can no longer be compensated within a predetermined time by the vacuum pump installation. When the pumping time set on the time switch 83 is exceeded, which pumping time exceeds the pumping time of the pump 78 required for the equalization of leakage losses or of pressure- and temperature- fluctuations, the alarm circuit is closed by the momentary switch 82, so that then just as upon a further dropping of the vacuum, the red alarm lamp 24 lights up and the buzzer 29 sounds.

The pump 78, however, constantly withdraws air from the float container 91. As long as the tank 36 fails to have a sufficient vacuum, the fluid rises in the float container 91 and lifts the float 96. The latter holds the valve 94 open until the air or gas space of the tank 36 has attained the desired vacuum, at which time the valve 94 closes. The pump 78 now quickly produces the predetermined lower desired value of the vacuum in the float container 91, and this vacuum preferably balances a head of liquid of the tank diameter plus an addition in order to prevent an outflow of fluid from the tank under all circumstances. This will cause first the alarm switch 107 constructed as a diaphragm switch to open and thereby the alarm circuit is opened. Upon a further rise in the vacuum during the pump, there opens also the pre-alarm switch 106, likewise constructed as diaphragm switch, so that the circuit for the vacuum pump 78, the pre-alarm lamp 23 and the clockwork of the time switch 83 is opened. The clockwork of the time switch 83 accordingly snaps back—as each time upon disconnection—into its starting position. In this manner is effected the normal condition of the leak-indicating- and fluid-loss-protection-device, and it is insured that in any case a vacuum is caused to be present, which is sufficient to hold the fluid column up to approximately float level, so that the vacuum present in the gas space of the tank 36 is always greater than the hydrostatic pressure of the fluid column in the tank, so that upon the occurrence of a leak an outflow of fluid is prevented.

By means of the pre-alarm switch 105, which controls the operation of the vacuum pump 78, a predetermined minimum vacuum will be maintained in the air space of the float container 91, namely as long as no leak is present through which considerable quantities of air may enter.

If now the vacuum drops as a result of small leakage losses at threaded connections, seals on the tank or at other points in the vacuum installation or even caused by fluctuations in temperature, then the fluid rises in the float container 91 and the float 96 opens the valve 94, so that when the vacuum set by the pre-alarm switch 122 is exceeded the pump will be connected and withdraws air or gas from the space in the tank 36, until upon the attainment of a predetermined pressure equalization between the vacuum in the tank and the vacuum held constant in the float container, the flat drops and closes the valve 94. If the pump 78, however, within the time set by the time switch 83 is not able to produce the vacuum set on the pre-alarm switch, then the switch contacts of the time switch 83 close the alarm circuit—which has the result, that on the switchboard 116 the red alarm lamp 24 lights up and the buzzer sounds which latter is connected to operate upon the second impulse of the momentary switch 82. This happens particularly when a smaller leak is present, through which only a small quantity of air enters, which corresponds approximately to the volume of air withdrawn by the pump. If, however, a larger leak is present, then the pump 78 is not able to prevent a further lowering of the vacuum down to the alarm value set on the alarm switch 106, which immediately releases the alarm and lights up the red alarm lamp 24 and activates the buzzer 29. The preferably lead-sealed buzzer switch 30 may be opened to stop the buzzer 29 after the necessary safety measures have been initiated.

The constant readiness of operation of the pre-alarm circuit may be tested by actuating the push button switch 85, which bridges the pre-alarm-switch, and the readiness of operation of the buzzer by actuating the push-button-switch 86, which is adapted to close the buzzer circuit.

If, however, by way of example, due to removal of fluid from the tank the maximum vacuum set on the diaphragm switch 105 is exceeded, then the circuit of the ventilating valve 80 is closed, which ventilates the gas space in the tank 36 for as long until the mentioned vacuum has again been produced.

Figures 6, 8:
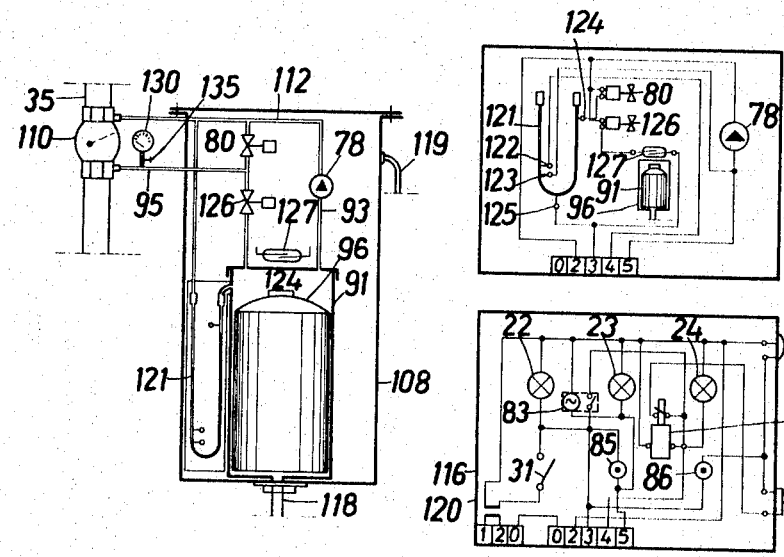
FIG. 6 illustrates a modified embodiment of the float-control device.
FIGS. 7 and 8 illustrate details of the switch arrangement employed with the modified float control device.

In the embodiment of the invention shown in FIG. 6, the three diaphragm switches 105, 106, 107 are replaced by a U-pipe-manometer switch 121, in the leg of which electrical contacts 122, 123 and 124 are provided at the points which correspond to the vacuums set on the diaphragm switches.

Figure 7:
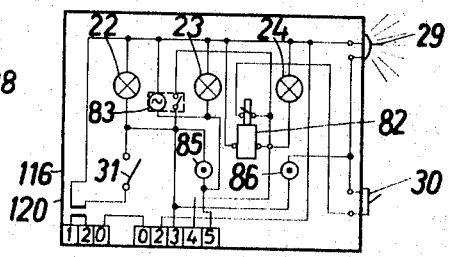

In place of the mechanical valve 94, the embodiment of FIG. 6 is provided with a solenoid switch disposed outside of the float container 91. This solenoid switch has the protective gas contacts 127, which are actuated by a permanent magnet 124 fixed on the top of the float 96. Instead of the protective gas-contact switch a microswitch may also be employed which is likewise actuated by the permanent magnet 124. This switch 127, as shown in FIG. 7, controls a solenoid valve 126 which is energized upon a rising of the float 96 and upon opening establishes a communication between the pipe line 95 and the gas space in the tank 36 and to the gas chamber in the float container 91.

The control arrangement shown in FIG. 8 corresponds essentially to the control arrangement shown in FIG. 4, with the exception that the current supply takes place through a transformer 120 so that the circuits may operate at lower voltages. The other parts are provided with the same reference characters as in FIGS. 1 to 5, and therefore need not be described in detail at this time, nor is it necessary to repeat the modus operandi of the device.

In the modified embodiment shown in FIGS. 9 to 13, the leak-indicating- and fluid-loss-protection device according to the invention, is not as in the embodiments described previously, inserted in the vent conduit, but in the oil-supply- and return-pipes connected with the burner 6 of the boiler 7. This leak-indicating- and fluid-loss-preventing-device consists of an intermediate container 91a, which is connected with the pipe line 39 coming from the tank 36 and a control device 108a disposed thereabove. In the intermediate container 91a is disposed a float housing 91b whose lower end is open and which is immersed in the fluid. The float housing 91b contains a float 96. Through the pipe line 39 and the return pipe line 40 the oil burner 6 of the boiler 7 is in communication with the fluid in the intermediate container 91a. Another part of the return pipe line 40 which terminates in the tank 36 above the fluid serves now as air-suction-pipe line 40a, which establishes a communication between the gas-space 38 in the tank 36 above the fluid level 37 therein and the control device 108a. This pipe line 40a is, as shown in FIG. 10, connected within the control device with a manometer 130 and includes a regulating valve 135 and a branch conduit 39b which by a solenoid valve 126 may be brought in communication with the gas space in the float-housing 91b and by a solenoid valve 80 with the atmosphere. To the gas space in the float container 91b is further connected a suction pump 78 having an exhaust line 112, while a regulating valve 132 is connected with a control switch 121a. The control switch 121a may be constructed as a three-stage diaphragm switch, whose contacts 124a (FIG. 13) set at the maximum vacuum are adapted to close the circuit of the vent valve 80, which connects the gas space 38 in the tank 36 through the pipe line 40a with the atmosphere. The contacts 122a set for the pre-alarm-vacuum close, as before, the pre-alarm circuit which includes the pre-alarm lamp 23, the pump and the clockwork of the time switch 83. The contacts 125a set for a still lower vacuum close the alarm circuit, which comprises the red alarm lamp 24 and the buzzer 29 by means of the momentary switch 82 and the manual switch 30. Instead of this three-stage diaphragm switch, as shown in FIG. 13, it is also possible to employ according to FIG. 11 a mercury-containing-U-pipe the operative leg of which is provided with contacts at the height of the various mercury levels indicating different vacuums or vacua, or on the liquid level of which a magnet body floats, which closes the protective gas-contacts h, i, k, disposed outside of the mercury container at corresponding heights.

The operation of the vacuum installation according to FIGS. 9 to 13 corresponds substantially to the operation of the installation disclosed in the FIGS. 1 to 4 and it therefore requires at this time no description in detail. The rising of the float 96 causes the permanent magnet 124 disposed on the top of the float to close the protective gas contacts 127 or a mirco-switch not particularly described, and this causes the closing of the circuit for the solenoid valve 126, so that the latter opens and establishes a communication between the gas space in the float housing 91b and the gas space in the tank 36 through the pipe line 40a. Due to the fact that the vent pipe 35 is provided with the valve flap 110a, the desired vacuum may be produced by the control device 108a in the gas space 38 of the tank 36, which vacuum is held constantly only so high by the float device, as is necessary with the particular condition of the fluid in the tank for preventing a loss of fluid. Due to the fact that the vacuum present in the tank corresponds to the liquid level therein, the latter may be read from the vacuum-meter 130 which is calibrated in units of fluid so that the reading gives an indication of the amount of fluid in the tank.

FIG. 14 illustrates a fuel storage tank battery installed in a basement comprising two storage tanks 36d and 36c arranged one next to each other and provided with a common filling pipe 41a and a common vent pipe 35. The arrangement is such that only a single float control device such as shown in FIGS. 1 and 2 is required as is indicated by the flow controling housing 108.

Similar parts in the FIGS. 1, 2 and 14 are provided with the same reference numerals and the operation of the control devices is the same for both of the interconnected tanks 36d and 36c as with one tank 36.

What I claim is:

1. In combination with a fuel storage tank installation, a leak indicating and fluid loss preventing means comprising a pumping device and a vacuum control device for producing and maintaining in said tank a predetermined vacuum which corresponds at least to the prevailing fuel level in said tank, said vacuum control device including a float container with a float therein, means connecting the fluid space of said float container with the fluid body in said tank, means for connecting the air space in said float container with said pumping device for producing a vacuum in the air space of said float container, communicating means between the air space in said float container and the air space in said tank, and valve means in said communicating means controlled by said float and adapted to establish communication between said air space in said float container and the air space in said tank.

2. The combination according to claim 1, in which said valve means in said communicating means comprises a normally closed plate valve (94) which is mechanically opened by said float when it has risen a predetermined distance.

3. In combination with a fuel storage tank installation, a leak indicating and fluid loss preventing means comprising a pumping device and a vacuum control device for producing and maintaining in said tank a predetermined vacuum which corresponds at least to the prevailing fuel level in said tank, said vacuum control device including a float container with a float therein, means connecting the fluid space of said float container with the fluid body in said tank, means for connecting the air space in said float container with said pumping device for producing a vacuum in the air space of said float container, communicating means between the air space in said float container and the air space in said tank, and valve means in said communicating means controlled by said float and adapted to establish communication between said air space in said float container and the air space in said tank, said valve means including a solenoid valve (126) arranged in a circuit provided with contacts adapted to be closed by said float when it has risen to a predetermined position in said float container.

4. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator.

5. The combination according to claim 1, including means for producing a maximum vacuum and two minimum vacua in the air space of said float container, said means comprising three separate diaphragm switches arranged in a branch line connected with said air space in said float container, said diaphragm switches having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator.

6. The combination according to claim 1, including means for producing a maximum vacuum and two minimum vacua in the air space of said float container, said means comprising a U-pipe manometer switch arranged in a branch line connected with said air space in said float container, said switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator.

7. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm indicator, and means for connecting said pumping device in said pre-alarm circuit.

8. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator, and including a time switch in said pre-alarm circuit for closing the latter after a predetermined period of time.

9. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator, and including a momentary switch in said alarm-circuit for operating a buzzer.

10. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator, and including a push-button switch which independently of said three-stage diaphragm switch is adapted to close said pre-alarm circuit.

11. The combination according to claim 5, including a push-button switch which independently of said three separate diaphragm switches is adapted to close said pre-alarm circuit.

12. The combination according to claim 6, including a push-button switch which independently of said U-pipe manometer switch is adapted to close said pre-alarm circuit.

13. The combination according to claim 1, including means for producing a maximum vacuum and two minimum vacua in the air space of said float container, said means comprising a three-stage diaphragm switch arranged in a branch line connected with said air space in said float container, said diaphragm switch having electrical contacts controlling the operation of a vent valve (80) in said branch line, said contacts being set for a maximum vacuum and will close an electric circuit when said maximum vacuum is exceeded to actuate said vent valve, other contacts being set for a first minimum vacuum to close a pre-alarm circuit for a pre-alarm indicator, while still other contacts are set for a second minimum vacuum to close an alarm-circuit for an alarm-indicator, and including an impulse switch in said alarm circuit which is arranged and constructed in such a manner that it operates a buzzer only upon a second impulse.

No references cited.

NEIL C. READ, *Primary Examiner.*

D. MYER, *Assistant Examiner.*